(12) United States Patent
Molero Mendez

(10) Patent No.: US 11,185,095 B2
(45) Date of Patent: Nov. 30, 2021

(54) PROBIOTIC FERMENTED WHEY BASED BEVERAGE, AND METHOD FOR PRODUCING SAME

(71) Applicant: Monica Sofia Molero Mendez, Houston, TX (US)

(72) Inventor: Monica Sofia Molero Mendez, Houston, TX (US)

(73) Assignee: Monica Sofia Molero Mendez, Houston, TX (US)

( * ) Notice: Subject to any disclaimer, the term of this patent is extended or adjusted under 35 U.S.C. 154(b) by 268 days.

(21) Appl. No.: 15/981,597

(22) Filed: May 16, 2018

(65) Prior Publication Data

US 2019/0350228 A1 Nov. 21, 2019

(51) Int. Cl.
*A23L 2/38* (2021.01)
*A23C 21/02* (2006.01)
*A23C 19/032* (2006.01)
*A23C 19/05* (2006.01)

(52) U.S. Cl.
CPC .......... *A23L 2/382* (2013.01); *A23C 19/0326* (2013.01); *A23C 19/054* (2013.01); *A23C 21/026* (2013.01); *A23V 2002/00* (2013.01); *A23Y 2220/03* (2013.01); *A23Y 2220/15* (2013.01); *A23Y 2220/29* (2013.01); *A23Y 2240/65* (2013.01); *A23Y 2240/75* (2013.01)

(58) Field of Classification Search
CPC ....... A23L 2/382; A23C 21/026; A23C 21/02; A23C 21/102
See application file for complete search history.

(56) References Cited

U.S. PATENT DOCUMENTS

| | | | | |
|---|---|---|---|---|
| 2010/0136203 A1* | 6/2010 | Sakata | ...................... | A23L 2/38 426/590 |
| 2013/0266692 A1* | 10/2013 | Saito | ...................... | A23C 9/127 426/43 |

OTHER PUBLICATIONS

"Codex Standard for Fermented Milks", Codex Stan 243-2003, Milk and Milk Products (2nd Edition), pp. 1-11.
COVENIN 1053-82; "Fluid Milk Determination of Fat Content Gerber Method" 1st Review, 1982, Venezuelan Commission of Industrial Standards.
COVENIN 1315-79, "Foods. ph Detemination (Ionic Acidity)" 1979, Venezuelan Commission of Industrial Standards.
COVENIN 2393:2001; "Yogurt" 3rd Review, 1987, Venezuelan Commission of Industrial Standards.
COVENIN 368:1997; "Milk and Its By-Products. Determination of Ash Content" 2nd Review, 1997, Venezuelan Commission of Industrial Standards.
COVENIN 370-1997; "Milk and Its By-Products. Determination of Protein Content" 2nd Review, 1997, Venezuelan Commission of Industrial Standards.
COVENIN 658:1997; "Milk and Its By-Products. Determination of the Titratable Acidity" 3rd Review, 1997, Venezuelan Commission of Industrial Standards.
COVENIN 902-87; "Foods. Method for Counting Aerobic Bacteria Colonies in Petri Dishes" 2nd Review, 1987, Venezuelan Commission of Industrial Standards.
Cuellas et al., "Development of Energy Drinks From Cheese Whey" Revista Del Laboratorio Tecnologico Del Uruguay, Nov. 5, 2010, pp. 54-57.
Dubois et al., "Colorimetric Method for Determination of Sugars and Related Substances" Division of Biochemistry, University of Minnesota, 28(3), 1956, pp. 350-356.
Gonzalez et al., "Evolution of the Venezuelan Foods Composition Table" Latin-American Nutrition Society—Venezuelan Chapter, 2001.
Miller Gail Lorenz, "Use of Dinitrosalicylic Acid Reagent for Determination of Reducing Sugar" Analytical Chemistry, 31(3), pp. 426-428.
Molero-Mendez et al. "Physicochemical Characterization of Whey Obtained By Cheese Making Process Applying an Artisanal Method" Revista Cientifica, 27(3), 2017, pp. 149-153.
Ricardo Adolfo Parra Huertes, "Whey: Importance in the Food Industry" Rev.Fac.Nal.Agr.Medellin, 62(1), Apr. 16, 2009, pp. 4967-4982.
Aider et al., "Skim Acidic Milk Whey Cryoconcentration and Assessment of Its Functional Properties: Impact of Processing Conditions" Innovative Food Science and Emerging Technologies 10 (2009), pp. 334-341.
Alvarez-Olmos et al., "Probiotic Agents and Infectious Diseases: A Modern Perspective on a Traditional Therapy" Probiotic Agents and Infectious Diseases, CID 2001:32, Jun. 1, 2001, pp. 1567-1576.

(Continued)

*Primary Examiner* — Jeffrey P Mornhinweg
(74) *Attorney, Agent, or Firm* — Arent Fox LLP

(57) ABSTRACT

The present invention discloses a novel probiotic fermented beverage based on whey, comprising whey and a high probiotic microorganism concentration in the range of $10^7$-$10^8$ CFU/mL, and a method for producing said beverage. The probiotic microorganism is a commercial yogurt culture of *Streptococcus salivarus* subsp. *thermophilus* and *Lactobacillus delbruecki* subsp. *bulgaricus* and a commercial culture of *Lactobacillus acidophilus*. The method for producing the probiotic fermented whey based beverage comprises recovering whey by an enzymatic coagulation process, percolation, enriching and pasteurizing whey, fermentation, sweeting and flavoring. The beverage comprises the following physico-chemical characteristics: pH 5.0±0.00; titratable acidity 68.0±1.4 mL NaOH 0.1N/100 mL; total solids 12.4±0.1% w/v; fat 0.8±0.1% w/v; protein 1±0.1% w/v; cinder 0.55±0.02% w/v; Total sugar 10.0±0.2% w/v; Reducing sugar 4.20±0.15% w/v; and Energic value 87.2±0.00 cal/100 g sample. The beverage comprises the following physico-chemical characteristics and probiotics count at 4° C. and 8° C.: 1-21 day shelf-life; pH 4.77-4.85; titratable acidity 72-73 mL NaOH 0.1N/100 mL; and probiotic count of about $31 \times 10^7$-$39 \times 10^7$ CFU/mL.

5 Claims, 4 Drawing Sheets

(56) References Cited

OTHER PUBLICATIONS

Bouzar et al., "Exopolysaccharide Production and Texture-Promoting Abilities of Mixed-Strain Starter Cultures in Yogurt Production" Journal of Dairy Science, vol. 80, No. 10, 1997, pp. 2310-2317.
Geoffrey W. Smithers, "Whey and Whey Proteins-From 'Gutter-To-Gold'" International Dairy Journal 18 (2008), pp. 695-704.
J N de Wit, "Dairy Ingredients in Non-Dairy Foods" Consultant Food Proteins, Renkum, The Netherlands, 2002, pp. 718-727.
Khalil et al., "Evaluation of the Probiotic Potential of Lactic Acid Bacteria Isolated From Faeces of Breast-Fed Infants in Egypt" African Journal of Biotechnology vol. 6 (7), Apr. 2, 2017, pp. 939-949.
Knut J. Heller, "Probiotic bacteria in Fermented Foods: Product Characteristics and Starter Organisms 1-3" American Journal for Clinical Nutrition 2001, 73(suppl): 374S-379S.
Laws et al.. "Biosynthesis, Characterisation, and Design of Bacterial Exopolysaccharides From Lactic Acid Bacteria" Biotechnology Advances 19 (2001), pp. 597-625.
Lilly et al., "Probiotics: Growth-Promoting Factors Produced by Microorganisms" Science, vol. 147, Feb. 12, 1965, pp. 747-748.
Vasudha et al., "Non Dairy Probiotic Beverages" International Food Research Journal 20(1): 2013, pp. 7-15.

\* cited by examiner

PROBIOTIC FERMENTED WHEY BASED BEVERAGE, AND METHOD FOR PRODUCING SAME

BACKGROUND

The present disclosure relates to a probiotic fermented whey based beverage. This disclosure also relates to a method for producing fermented whey based beverages.

During the last decades, the use of probiotics has increased due to their important benefits in human health. It has been suggested the term denotes all organic and inorganic food complexes as "probiotics," in contrast to harmful antibiotics, for the purpose of upgrading such food complexes as supplements. Further the term "probiotic" has been used to describe substances secreted by organisms that stimulate the growth of another. Since then, the definition has evolved remarkably, such that today, the term probiotics are generally defined as microbial dietary supplements which, when introduced in sufficient amount, affect humans beneficially through their effects on the intestinal tract. On the other hand, others have defined them as live microbial supplements, which beneficially affect the host by improving its intestinal microbial balance.

There is growing interest in using dairy products as a healthy alternative to increasing probiotics consumption. Some have attempted to develop fermented beverages based on milk, whey or mixture thereof. Whey, however, has been used less than milk and has wonderful physico-chemical characteristics that make it an excellent substrate to be used in the development of fermented beverages.

Whey is a green translucent liquid obtained by separating milk clot in cheese making process. Its composition and characteristics depend on the technological process used and the type of milk. It is composed of 5% lactose, 93% water, 0.85% protein, 0.53% minerals, and 0.36% fat.

Whey possesses the characteristics of a fluid of yellowish greenish color, turbid, fresh taste, weakly sweet, acidic, with a nutrient content of about 5.5 to 7% that come from milk. It retains about 55% of total milk ingredients like lactose, soluble proteins, lipids and mineral salts. Whey is a by-product with high energetic and nutritional quality. For humans, it represents an important source of vitamins, proteins and carbohydrates.

Some statistical studies have indicated that a significant portion of the whey, a waste by-product generated during the cheese manufacturing process, is discarded in tributaries, resulting in environmental hazards due to whey's high biochemical oxygen demand. It physically and chemically affects the soil structure, decreasing the yield of agricultural crops and polluting water because it depletes dissolved oxygen.

For the reasons explained above, the dairy industry has been looking for alternatives uses for the whey waste by-product, which is a pollutant with great nutritional value. Among the products of successful acceptance are fermented dairy drinks, refreshing beverages, protein concentrates, infant formulas, among others. Whey products improve texture, reduce flavor and color, emulsify, stabilize, improve flow properties and show many other functional properties that increase the quality of the products.

Lactic acid bacteria (LAB) play an important role in fermentation processes. They are widely used in food industry because of their involvement in texture, taste, smell and aroma development of fermented foods.

LABs may be contained in a group of microorganisms named lactic cultures or starters. They are used in the dairy industry for fermenting milk, cheeses, butter and other fermented products fermented. LABs were referred to as probiotics in the 1960s.

The scientific interest in bacteria as protective agents against different diseases comes from observations, beginning in of the 20th century, that emphasized the longevity and good health of the Bulgarian peasants, who consumed large quantities of yoghurt.

The observations of multiple scientists assumed that consumption of large quantities of foods rich in lactic acid bacteria, eliminated toxin-forming bacteria, while raising the proportion of lactic acid bacteria and intestinal flora, improved health and increased life expectancy. Since then, and throughout almost a hundred years of study, various authors have endeavored to know different functions of beneficial microorganisms that populate the digestive tract.

The term "probiotics" has been used to describe those substances secreted by organisms that stimulate the growth of another, as opposed to the term "antibiotic," understood as any chemical compound used to eliminate or inhibit the growth of infectious organisms. In 1974, the term "probiotic" was first used to refer to organisms and substances that contribute to intestinal balance.

Probiotics must meet some basic requirements to be selected in the development of commercial probiotic products. The most important requirements include: the probiotic microorganism survives in the product, the physical and genetic stability during product storage is guaranteed, and all its properties that evidence its health benefits after consumption, are maintained during manufacture and storage of the product. The criteria for primer selection includes acidification, aroma, taste, stability and texture.

A great deal of literature exists regarding whey fermentation processes.

One prior process relates to a process for producing a probiotic fermented whey based beverage, using whey powder. The optimum technological parameters were $Lactobacillus$ ($L$) $acidophilus$ and $L.$ $casei$ 1: 1.3% inoculation amount; fermentation temperature was 35° C., fermentation time was 8 hours, compound stabilizer: CMC 0.25%, PGA 0.15%, pectin 0.1%.

The use of whey powder as a substrate is distinguishable from the whey based beverages described in this application. For example, the whey based beverage described here uses fresh whey that comes from the cheese making process, preferably the artisanal cheese making process. The production of whey powder based beverage of the prior art utilizes a different technical process, which requires desalting, blending and homogenizing the components. The sensorial characteristics are also different with respect to viscosity, flavor and odor. On the other hand, the whey based beverage described in this disclosure differs in the starter culture, which includes $L.$ $acidophilus$ and $L.$ $casei$, that contribute with the microbiological, physico-chemical and sensorial characteristic changes of the beverage.

Another prior process relates to a whey fermentation beverage using no stabilizer. The raw material is mixed with a 2%-7% mixture of a highly pure protein, sterilized, cooled and inoculated with an acid lactic culture, with a homogeneous process with controlled pressure. While another prior process relates to a whey fermented drink with low viscosity, containing 0.1-0.3% mass lactoferin as a precipitation preventing agent.

The prior art beverages discussed above include different substrates, introduce a protein mixture, and include a lactoferin as a precipitation preventing agent. All of these prior art features result in a process of making beverages having different characteristics. The beverage that is proposed in this disclosure is distinguishable from the prior art beverages because it is based on whey alone, making the drink easier to develop inside a very specific technical process. Furthermore, none of the beverages described in the prior art, mentioned above are probiotics. The whey based beverage drink described in this disclosure is also a probiotic, which makes the beverage healthier and with benefits that have been proved through the years.

SUMMARY

Accordingly, an aspect of the present disclosure includes a novel probiotic, fermented, whey based beverage. The probiotic, fermented, whey based beverage includes one or more of the following characteristics:

The pH of the whey based beverage is in the range of about 4.5-5.5, preferably about 4.7-5.3.

The concentration of probiotic microorganisms in the beverage is approximately $10^7$-$10^8$ CFU/ml.

The whey, obtained from cheese production, is enriched, until reaching a percentage of total solids and a consistency similar to milk, through the use of sucrose (2%-4%), milk powder (1%-3%), carboxymethyl cellulose (CMC) (0.5%-0.8%). The total solids of the probiotic fermented beverage was about 11.5%-12.5% weight/volume (w/v), preferably about 11.8%-12.3% w/v.

Two starter cultures were used in the preparation of the beverage: 1) a commercial lyophilized culture for yogurt composed of *Streptococcus salivarus* subsp. *thermophilus* and *Lactobacillus delbruecki* subsp. *bulgaricus* and (2) a commercial crop of *Lactobacillus acidophilus*.

A further aspect of the present disclosure relates to a process for obtaining cheese through an artisanal method, comprising:

Heating and cooling calcium chloride and rennet addition, standing, cutting the curd and whey collecting.

Another aspect of the present disclosure relates to applying standard methods for developing the fermented beverage mentioned above. For example, the use of percolation, preparation, Pasteurization, fermentation, sweeting, and flavoring may be applied to the process of preparing the whey based beverages described in the present disclosure.

DETAILED DESCRIPTION

Figure 1:
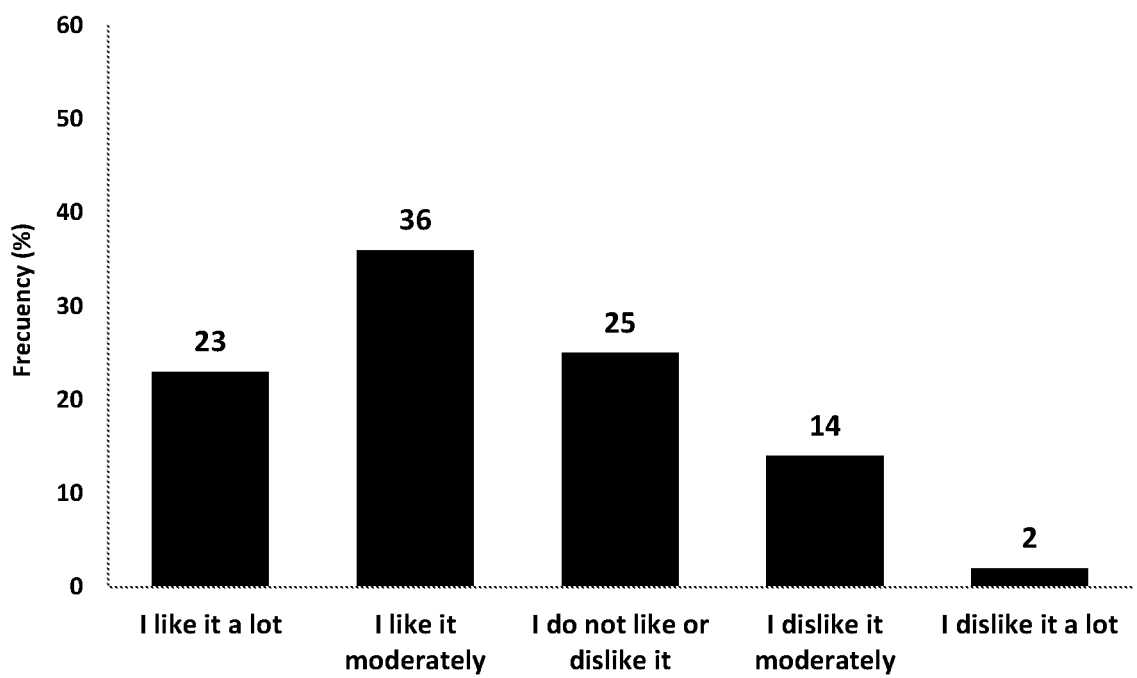
FIG. 1 is a graph of example results including a number of ratings (vertical axis) for each of a hedonic 5 point scale (horizontal axis) for a sensory evaluation acceptance test based on a flavor of a fermented milk drink, according to the present disclosure, given to a panel of 100 untrained judges.
Figure 2:
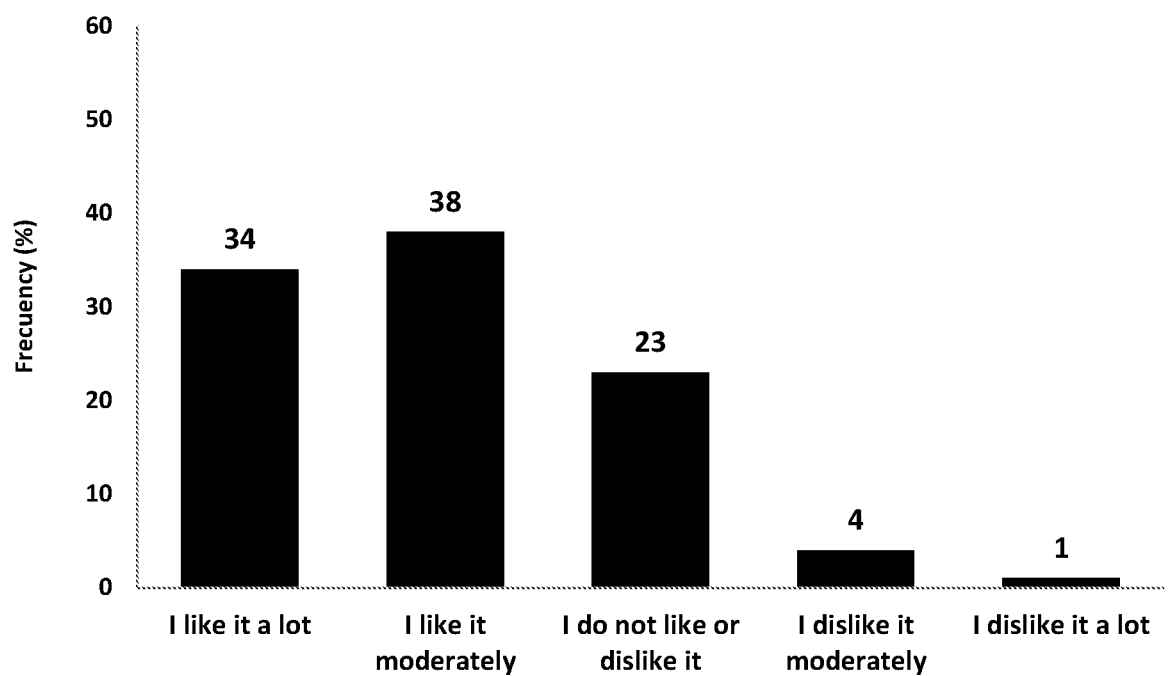
FIG. 2 is a graph of example results including a number of ratings (vertical axis) for each of a hedonic 5 point scale (horizontal axis) for a sensory evaluation acceptance test based on a consistency of a fermented milk drink given to a panel of 100 untrained judges.
Figure 3:
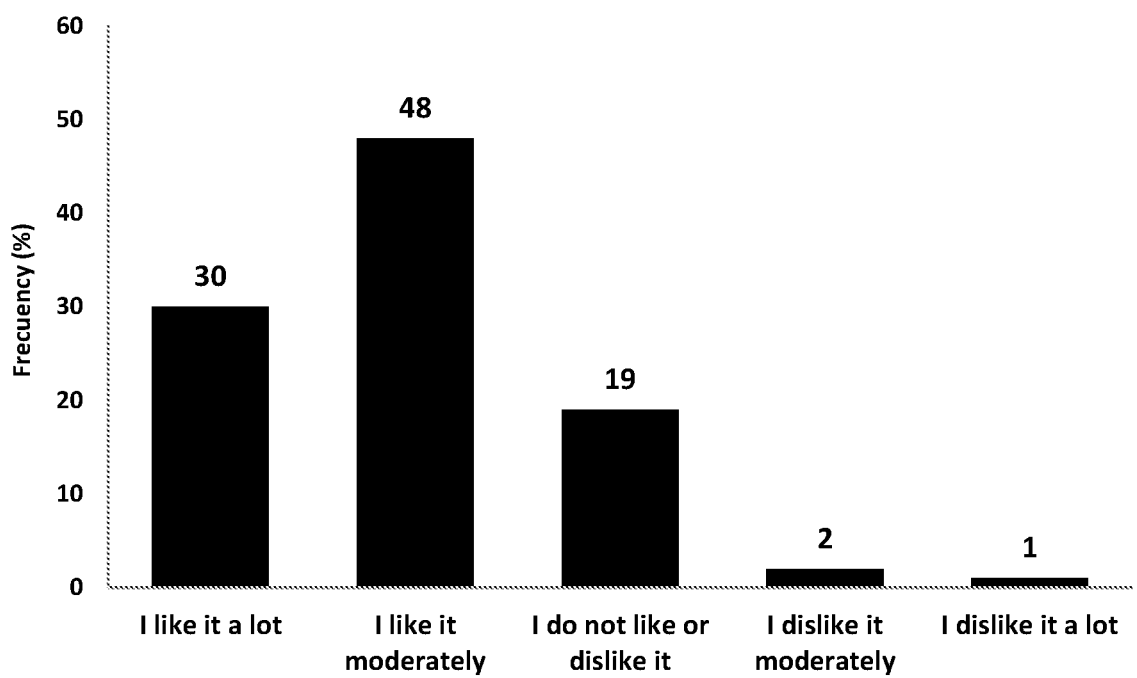
FIG. 3 is a graph of example results including a number of ratings (vertical axis) for each of a hedonic 5 point scale (horizontal axis) for a sensory evaluation acceptance test based on a general acceptance of a fermented milk drink give to a panel of 100 untrained judges.

Referring to FIGS. 1-3, results of a sensory evaluation acceptance test of a fermented milk drink according to the present disclosure include judges' impressions that were collected for each attribute of flavor, consistency, and general acceptance, respectively. The samples were presented randomly to each judge with a notice that the evaluated sample was a fermented milk drink. The judges were instructed to rate each attribute on a hedonic scale from 1 to 5, based on the following interpretation:

1: "I like it a lot."
2: "I like it moderately."
3: "I do not like or dislike it."
4: "I dislike it moderately."
5: "I dislike it a lot."

To summarize, the results show approximately 60% of the panelists selected options 1 and 2 (i.e., "I like it a lot" and "I like it moderately," respectively) referring to the flavor; more than 70% of the panelists selected options 1 and 2 referring to the consistency; and approximately 80% of the panelists selected options 1 and 2 referring to the beverage general acceptance. These results suggest that a whey based beverage, as described in accordance to the present disclosure, was well accepted by the potential consumers.

Figure 4:
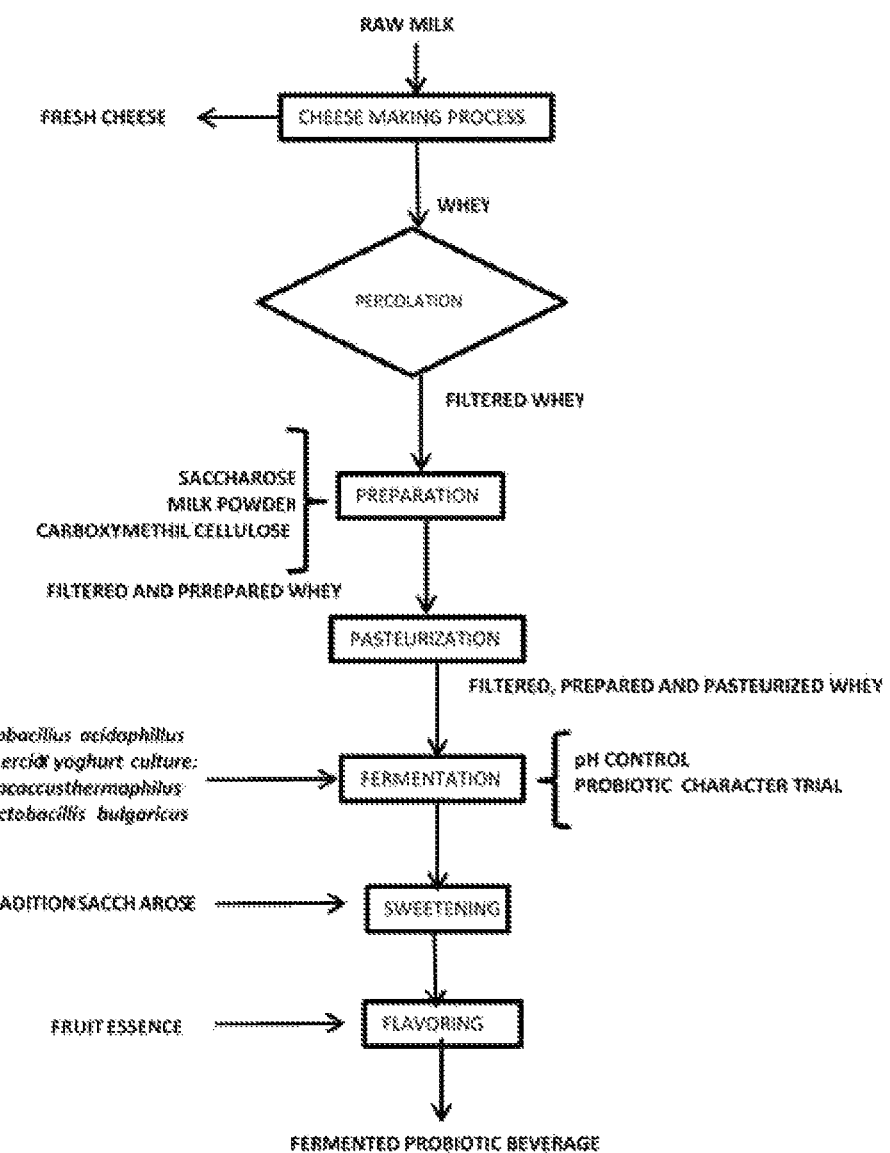
FIG. 4 is a flow chart of an example of a standard procedure for obtaining a probiotic fermented beverage.

Referring to FIG. 4, an example standard procedure for obtaining a probiotic fermented beverage includes the following.

1. Cheese Making Process

The raw material used is fresh milk. The whey is obtained by enzymatic coagulation using rennet in a standardized procedure similar to the industrial process.

The raw milk is subjected to heating to about 65° C.

The temperature is controlled between about 60° C. and about 65° C. for approximately 20 minutes.

It is allowed to cool to about 40° C.

Calcium chloride ($CaCl_2$) is added at about 0.03% w/v and after 2 minutes the rennet is added to about 0.01% w/v.

The mixture is allowed to stand for approximately 45 minutes, at which time the curd formation was already observed.

The curd is cut, separating it from the remaining serum, filtering it to avoid entrainment of casein fines.

The whey is collected.

2. Preparation and Pasteurization of Whey

The whey obtained from cheese production is enriched, until the whey reaches a percentage of total solids and a consistency similar to milk, through the use of sucrose (about 2%), milk powder (about 1%), carboxymethyl cellulose (CMC) (about 0.5%). It is then subjected to a slow pasteurization process under standard conditions, using a water bath at approximately 65° C., controlling the temperature for approximately 20 minutes.

Pasteurization is carried out in order to eliminate the pathogenic microbial load, to inactivate the rennet enzymes and to reduce the concentration of lactic bacteria present, such that the lactic acid bacteria avoids competition with the bacteria inoculated for the fermentation. To evaluate the effectiveness of pasteurization, the reconstituted and pasteurized whey is submitted to a simple microbiological test to determine the amount of aerobic mesophilic microorganisms present.

3. Beverage Preparation

The previously enriched and pasteurized whey is subjected to a fermentation process with the inoculation of the microbial cultures mentioned above. The fermentation is carried out in flasks inoculated with 80 mL of whey, 10 mL of commercial *Lactobacillus acidophilus*, and 10 mL of commercial yogurt culture. Both cultures are inoculated at an average concentration of $10^5$ CFU/mL. Flasks are kept in an incubator with a controlled temperature between 38° C. and 40° C. The pH is monitored hourly for both fermentations, stopping the same when the pH reaches a value of 4.5-4.9. Flasks are cooled to temperatures between approximately 4 and 8° C. Fermented beverages are stored in glass containers and kept at refrigeration temperature (between approximately 4° C. and 8° C.) for further analysis. The counting of microorganisms is performed at the beginning of the fermentation, at the beginning of the pH drop and at the end of the fermentation.

4. Sweetening

After fermentation, saccharose is optionally added to the beverage to a final amount of about 4% and shaken until dissolved.

5. Flavoring

The addition of any fruit essence may be optionally added according to the manufacturer's recommendation.

Analysis of the Probiotic Fermented Whey Based Beverage Proposed in this Document A summary of the complete process is provided in the flow chart of FIG. 4.

1. Probiotic Character Trial

The probiotic character is determined as a function of the count of probiotic microorganisms in plate. For this, the methodology indicated in the COVENIN 902-87 standard is used to count colonies of aerobic bacteria in Petri dishes, where the amount of CFU present in each sample is determined. For this, successive dilutions with peptone water (0.1% w/v) in 1:9 ratios are prepared by plating on MRS agar and incubating the plates at 37° C. for 48 hours.

The results obtained were compared with that established in the Venezuelan COVENIN 2393-2001 standard for yogurt, as well as with that established in the International Standard CODEX 243-2003 for Fermented Milks (International Food Standards, Health Organization food and Agriculture Organization of the United Nations). In these regulations it is established that to be considered a probiotic, the product must contain a minimum of $10^6$ CFU/mL live microorganisms.

2. Physico-Chemical Characterization of the Probiotic Fermented Beverage pH and Titratable Acidity

The pH was determined following the procedure established in the Venezuelan Standard Covenin 1315-79. The titratable acidity was determined according to the provisions of the Venezuelan Standard Covenin 658-1997, which contemplates a titration in an alkaline solution.

Fat

The fat content was determined by the Gerber method, established in the Venezuelan Standard Covenin 1053-82, which is based on the capacity of 90% sulfuric acid to dissolve all the solids present in milk except fat. With centrifugal force the grease is able to form a transparent layer that is observed in the Gerber butyrometer.

Total Solids

The content of total solids was determined by a preliminary evaporation in a thermoelectric plate until the appearance of the first traces of brown color, followed by vacuum drying at 100° C.

Cinder

The ash content was determined following the provisions of Venezuelan Standard Covenin 368-1997 for the determination of ash from milk and its derivatives, in which the ash is defined as the incineration of total milk solids.

Proteins

The protein content was determined in accordance to the Venezuelan Standard Covenin 370: 1997 for the Determination of Proteins of milk and its derivatives. The method consists of mineralizing organic matter by digesting with concentrated sulfuric acid and catalysts, in order to transform the nitrogen into ammonia, which is distilled and collected in an acidic solution and subsequently evaluated.

Total Sugar

The content of total sugars was determined using a colorimetric method that is based on the fact that carbohydrates are particularly sensitive to strong acids and high temperatures. From there, a series of reactions occur that produces an end result having colorful compounds.

Reducing Sugar

The content of reducing sugars was determined by the 3-5 dinitrosalicylic acid (DNS) method, previous construction of the standard curve using glucose as a standard. This method is based on the reduction of the DNS by the sugars to 3-amino-5-nitrosalicylic acid, with the consequent development of color, measured as the absorbance at a wavelength of 550 nm.

Energic Value

To determine the energy value, the sum of the caloric intake of the components of the drink was determined, for which the content in grams of protein, fat and sugars was multiplied by the factor corresponding to each one. According to the Table of Food Composition of Venezuela emanated from the Venezuelan Chapter of the Latin American Nutrition Society (2001), a factor of 4 cal/gram of protein, 9 cal/gram of fat and 4 cal/gram of carbohydrates is used.

3. Shelf Life

To determine the shelf life of the beverage, a count of probiotic microorganisms was taken following storage of the beverage in a refrigerator (4-8° C.), at days 1, 7, 14 and 21 days after fermentation. The methodology indicated in the COVENIN 902-87 standard was followed for the counting of aerobic bacterial colonies in Petri dishes, where the amount of CFU present in a given sample was determined.

For this, successive dilutions were prepared with peptonated water (0.1% w/v) in 1:9 proportions, sowing on MRS agar and incubating the plates at 37° C. for 48 hours. Titration and pH determination were also carried out.

The invention claimed is:

1. A fermented beverage comprising as its principal active ingredients whey and a high probiotic microorganism comprising a first commercial yogurt culture of *Streptococcus salivarus* subsp. *thermophilus* and *Lactobacillus delbruecki* subsp. *bulgaricus* and a second commercial culture of *Lactobacillus acidophilus* with a total concentration of the combination of cultures in the range of $10^7$-$10^8$ CFU/mL and a pH in the range of 4.7-5.4 at the end of fermentation,
   wherein the fermented beverage is made by a process comprising
      recovering whey by a raw milk enzymatic coagulation process comprising adding 0.03% (w/v) $CaCl_2$) and 0.01% (w/v) rennet;
      enriching the whey in the presence of 2% sucrose, 1% milk powder and 0.5% carboxy methyl cellulose, wherein the enriching proceeds until the whey reaches a percentage of total solids and consistency similar to 12-13% of milk;
      pasteurizing the whey in a 65° C. water bath for approximately 20 minutes; and
      fermenting the whey,
         wherein the fermenting comprises:
            inoculating 10 ml of the first commercial culture with 10 ml of the second commercial culture into approximately 80 ml of whey, wherein each of the first and second commercial cultures is inoculated at a concentration of about $10^5$ CFU/ml;
      incubating at a controlled temperature between 38° C. and 40° C.;
      monitoring the pH; and
      adding saccharose to a final amount of 4%.

2. The beverage of claim 1, wherein the beverage comprises the following physico-chemical characteristics: pH 5.0±0.00; titratable acidity 68.0±1.4 mL NaOH 0.1N/100 mL; total solids 12.4±0.1% w/v; fat 0.8±0.1% w/v; protein 1±0.1% w/v; cinder 0.55±0.02% w/v; Total sugar 10.0±0.2% w/v; Reducing sugar 4.2 0±0.15% w/v; and Energic value 87.2±0.00 cal/100 g sample.

3. The beverage of claim 1, wherein the beverage comprises the following physico-chemical characteristics and probiotics count at 4° C. and 8° C.: 1-21 day shelf-life; pH 4.77-4.85; titratable acidity 72-73 mL NaOH 0.1N/100 mL; and probiotic count of about $31 \times 10^7$-$39 \times 10^7$ CFU/mL.

4. A method for producing a probiotic fermented whey based beverage according to claim 1, comprising:
   recovering whey by a raw milk enzymatic coagulation process comprising adding 0.03% (w/v) $CaCl_2$) and 0.01% (w/v) rennet;
   enriching the whey in the presence of 2% sucrose, 1% milk powder and 0.5% carboxymethyl cellulose, wherein the enriching proceeds until the whey reaches a percentage of total solids and consistency similar to 12-13% of milk;
   pasteurizing the whey in a 65° C. water bath for approximately 20 minutes; and
   fermenting the whey, wherein the fermenting comprises:
      inoculating 10 ml of commercial culture of *Lactobacillus acidophilus* and 10 ml of commercial yogurt culture into approximately 80 ml of whey, wherein the commercial yogurt culture includes *Streptococcus salivarus* subsp. *thermophilus* and *Lactobacillus delbruecki* subsp. *Bulgaricus*, and wherein each of the first and second commercial cultures is inoculated at a concentration of about $10^5$ CFU/ml;
   incubating at a controlled temperature between 38 and 40° C.;
   monitoring the pH; stopping the fermentation when a pH value of about 4.5-4.9 is reached; and
   adding saccharose to a final amount of 4%.

5. The beverage of claim 1, wherein the fermentation is stopped when the pH value is at a range of about 4.5-4.9.

* * * * *